Patented Feb. 11, 1947

2,415,551

UNITED STATES PATENT OFFICE 2,415,551

LAMINATED GREASEPROOF PAPER

George C. Borden, Jr., Easton, Pa., and Walter Herrick, Milford, N. J., assignors to Riegel Paper Corporation, New York, N. Y., a corporation of New Jersey No Drawing. Application May 30, 1944, Serial No. 538,086

4 Claims. (Cl. 154—46)

This invention relates to improvements in laminated grease-proof paper. More particularly, the invention relates to laminated grease-proof paper made by laminating sheets of grease-proof paper with a special laminating composition which is effective in securing the sheets together both at ordinary temperatures and at temperatures above the melting point of the composition.

Glassine paper and single sheets of other types of grease-proof paper, such as a coated or treated sulphite or kraft, have certain limitations or objections such as the tendency to fail when folded or creased in the packaging of products. In order to obtain pliability, softness and flexibility it is common practice to plasticize the paper with a hydroscopic material such as glycerine or invert sugars; but these materials attract moisture and are a detriment rather than an advantage when the paper is to be used for the protection of articles from rusting or absorbing moisture.

The present invention provides an improved wrapping material which overcomes or minimizes these objections. According to the present invention, two sheets of a grease-proof paper are laminated with a very soft grease-proof or moisture-proof material to give a composite or laminated paper having desirable properties for use in wrapping and packaging.

In the art of laminating glassine and other papers intended for wrapping and packaging, etc., it is known that difficulties are encountered when the temperature and/or humidity varies in the usage of the material causing unequal expansion in the two sheets due to different coefficients of expansion of the papers. It is also known that difficulties are met in obtaining the desirable flexibility at low temperatures and freedom from danger of separation of the sheets at high temperatures above the melting point of the laminating material. The practical and natural tendency has been to increase the melting point of the laminating material to prevent separation of the sheets at elevated temperatures, using a laminating material of a melting point higher than the temperature to which the paper is to be subjected. Thus for certain purposes the laminated sheet must stand a temperature of 140° F. for seven days without showing delamination; and to avoid melting of the laminating material at such temperatures, a material having a higher melting point, e. g., around 160° F., would be indicated. But the use of high melting laminating materials tends to make the sheet less pliable at ordinary temperatures and to give a more or less brittle sheet, and wrinkling of one or both of the sheets is likely to occur.

According to the present invention, a laminating material is used with a relatively low melting or softening range, for example, below 140° F. where the paper is to be subjected to such temperature, and even as low as 100° F.; and a special composition is used which maintains continual adherence of the sheets above the melting point of the laminating material as well as at ordinary temperatures, and even with sheets of unequal coefficients of expansion.

The laminating composition used in the present invention is a special resin-plasticizer blend combined with a fluxing material which is soluble in the resin-plasticizer blend when the composition is molten, but which is precipitated therefrom to a greater or less extent and held in a precipitated state when the composition is cooled. The resin-plasticizer blend is proportioned so as to give a satisfactory bond at normal temperatures at which the laminated paper is used. When the paper is heated above the melting point the resin plasticizer blend and melted flux form a thin liquid laminating layer which is also effective in preventing separation of the sheets at elevated temperatures while permitting sliding of the sheets where the sheets expand or contract at different rates.

The fluxing material used with the resin-plasticizer blend is one which is solid at ordinary temperatures but is molten at the temperature of the melting of the resin-plasticizer blend and which serves as a flux to make the composition more liquid during the application of the composition to the paper and in the finished paper when heated to a high temperature; and it is a material which is not more than sparingly soluble in the resin-plasticizer blend when solid.

As such fluxing agents may be mentioned hydrogenated soy bean oil, for example, having a melting point of 150° to 160° F., tristearin (glyceryl tristearate), hydrogenated castor oil and similar solid fatty materials, etc. Such fatty materials serve as a flux in the molten composition, giving it increased fluidity and a proper viscosity for the laminating operation, and, when the composition is chilled, the fatty materials slowly precipitate and the solidified film becomes a soft resin-plasticizer bond between the two pieces of paper, holding within itself, as in a matrix, the precipitated particles of the fatty material.

The resin plasticizer blend may be made of different resins and different plasticizers but is advantageously a blend of the resin and plasticizer in proper proportions to give a soft and very satisfactory bond at normal temperatures at which the laminated paper is used. Different resins can be used and different plasticizers, and the proportions of resin and plasticizer will vary with different resins and different plasticizers. As resins, rosin esters, cycloparaffin resins, etc., may be mentioned, and as suitable plasticizers may be mentioned mixed amyl naphthalene and other naphthalenes, dibutyl phthalate, tricresyl phosphate, etc.

The proportions of resin and plasticizer used in making the resin-plasticizer blend will vary somewhat with the particular resins and plasticizers used, but, in general, should be such as will form a soft, flexible laminating layer at ordinary temperatures. The resin-plasticizer blend by itself will, in general, be too viscous when melted to permit it to be readily applied as a laminating layer in ordinary equipment; and if the proportions of resin and plasticizer were changed to make the composition sufficiently fluid to run in normal equipment, it would not usually form a good laminating layer when used. But by compounding the fluxing material with the resin plasticizer blend, there is retained the desirable properties of a resin plasticizer blend of sufficiently high melting point to be a good laminant, and there is also imparted to the composition when melted a fluidity which permits ready application of the composition on ordinary equipment and which also gives a thin liquid layer between the sheets when heated above the melting point such that the sheets are kept from separating and are permitted movement with respect to each other.

As above stated, the added fatty material serves as a flux to give a thinly fluid melted composition at temperatures above its melting point while the fatty material slowly precipitates when the composition is cooled and solidified, giving a resin-plasticizer bond between the sheets of paper which holds within itself the precipitated particles of the fatty material. This separation of the fluxing material need not be a complete separation, and the resin-plasticizer blend after cooling may contain some of the fluxing material admixed therewith, while the precipitated particles of the fatty material may have some of the resin or plasticizer blended therewith. But in general, the effect is to give a thinly fluid melted composition with the fatty material serving as a flux and a desirable resin-plasticizer composition for securing the sheets of paper together at normal temperatures.

The invention is of special value in making laminated material from thin grease-proof sheets such as glassine, or grease-proof papers. The glassine paper of the present invention provides a composite or laminated sheet with desirable pliability, softness and flexibility at ordinary temperatures and which also retains desirable properties as a wrapping material at higher temperatures above the melting point of the laminating composition, for example, at temperatures around 140° F. for a period of, e. g., seven days.

The invention in its broader aspects is applicable to the making of laminated sheets of other material than glassine or of glassine with other material such that the resulting laminated sheets are made of sheets of the same kind or of different kinds of individual sheets. Thus glassine can advantageously be laminated with Cellophane. Individual sheets may be used which are uncoated as well as sheets which have been previously coated, for example, to impart improved water-proof properties as well as grease-proof properties. It is an advantage of the invention that laminated sheets can be made using sheets having different coefficients of expansion such as glassine paper laminated to Cellophane to give composite sheets which are satisfactory both at ordinary temperatures and at high temperatures above the melting point of the laminating composition.

The invention will be further illustrated by the following examples, but it will be understood that the invention is not limited thereto:

*Example I*

A laminating composition is made of the following ingredients in approximately the following proportions:

| | Per cent |
|---|---|
| Hydrogenated soy bean oil melting at 150°–160° F | 30 |
| Rosin ester (Reichhold's P-382) melting at 190°–220° F | 46 |
| Mixed amyl naphthalene | 24 |

These ingredients are melted and blended together in a jacketed kettle. It is desirable to add the plasticizer, the mixed amyl naphthalene, first and then melt the hydrogenated soy bean oil and finally add the resin previously broken into small particles. This composition has a melting point or softening range around 120° F. but it does not have a sharp melting point and is a thinly fluid composition at higher temperatures such that it can be applied to the paper on a standard laminating machine.

This composition is advantageously used in making laminated wrapping material using two sheets, both of which are non-absorbent grease-proof paper, such as glassine. Similar laminated sheets may be made from other non-absorbent grease-proof paper such as regenerated cellulose sheets or films or sulphite or kraft sheets coated with an impervious grease-proof film. Instead of using both sheets of the same grease-proof paper, combinations of different sheets can be used such as glassine with regenerated cellulose film, etc.

The quantity of laminating composition used should be such as to give a satisfactory grease-proof on the folds, or when the paper is folded, but not an excess so as to seep or exude from the edges of the sheet. Thus, where two 25 pound glassine sheets are used, the quantity of laminating composition is around 8 to 10 pounds per ream.

Rosin esters or modified rosin esters vary somewhat in their properties, and, with different rosin esters used in the above example, somewhat different properties are obtained in the product. Thus, when a modified pentaerythritol ester of rosin (Hercules' Pentalyn G) is used in the composition of the above example, a somewhat higher melting and less soft laminant is produced, which can, however, be modified by increasing the plasticizer, the amyl naphthalene.

*Example II*

A laminating composition is made of the following ingredients in approximately the following proportions:

| | Per cent |
|---|---|
| Hydrogenated soy bean oil | 33 |
| Rosin ester (P-382) | 52 |
| Dibutyl phthalate | 15 |

In this composition the dibutyl phthalate acts as the plasticizer. This composition can be compounded and used much the same as that of Example I.

Example III

The following composition illustrates the use of a harder, higher melting point resin such as a cycloparaffin resin with an increased amount of dibutyl phthalate as a plasticizer as compared with the composition of Example II:

| | Per cent |
|---|---|
| Hydrogenated soy bean oil | 30 |
| Cyclo paraffin resin (Nevillite 123) | 45 |
| Dibutyl phthalate | 25 |

This composition can be used in much the same manner described in Example I.

Example IV

The following example illustrates the use of hydrogenated castor oil as the fluxing material. This material has a somewhat higher melting point than hydrogenated soy bean oil or glyceryl tristearate, but the following composition forms a satisfactory laminant which is fluid below 140° F.

| | Per cent |
|---|---|
| Hydrogenated castor oil | 30 |
| Rosin ester (P-382) | 46 |
| Mixed amyl naphthalenes | 24 |

This laminating composition can be used in much the same manner as that of Example I.

In place of rosin esters, other resins can be used in making the laminating compositions, such as coumarone-indene resins, modified coumarone-indene resins and various phthalate and maleic alkyd resins, etc. With harder and brittle types of resins the plasticizer should be used in suitable proportions to give a soft laminating material at ordinary temperatures. The compositions should be such that they will blend in the melted state with the fat-like fluxing material.

It will be understood that when using different resins, plasticizers and fatty materials, the quantities and proportions of the various ingredients will be varied to obtain the desired melting point and the desired degree of adhesion both at ordinary temperature and above the melting point of the composition.

While the above examples describe the making of laminated sheets from two sheets of glassine, etc., with an intermediate layer of the laminating composition, three or more sheets can be similarly used where a thicker sheet is desired. Also the laminated sheet may be so coated or treated when desired, as by calendering, where the individual sheets have not been previously calendered, or by coating with a water-proof coating where improved water resistance is desired; or the sheets can be coated with heat-sealing lacquer to impart heat-sealing properties to the resulting sheets.

It is one advantage of the invention that the forming of the laminated sheets with the composite laminating composition can readily be carried out on standard laminating equipment. The thin, liquid character of the laminating composition when melted enables it to be readily applied in such equipment while on cooling of the laminated sheet the composition solidifies as above described to give a soft and advantageous laminating layer at ordinary temperatures.

We claim:

1. Laminated greaseproof paper having a laminating composition between the sheets of a resin-plasticizer blend containing precipitated normally solid fluxing material therein, said composition being thinly fluid at temperatures above its melting point and permitting sliding of the sheets and preventing separation of the sheets, the normally solid material serving as a flux for the resin-plasticizer blend when melted and precipitating therefrom when cooled.

2. Laminated greaseproof paper having a laminating composition between the sheets of a resin-plasticizer blend containing precipitated normally solid fatty material therein, said composition being thinly fluid at temperatures above its melting point and permitting sliding of the sheets and preventing separation of the sheets, the normally solid material serving as a flux for the resin-plasticizer blend when melted and precipitating therefrom when cooled.

3. Laminated greaseproof paper having a laminating composition between the sheets made up of resin, plasticizer and normally solid fatty material, said composition being thinly fluid at temperatures above its melting point and forming a soft, flexible bond of resin-plasticizer composition containing precipitated fatty material between the sheets of paper at normal temperature and permitting sliding of the sheets and preventing separation of the sheets, the normally solid material serving as a flux for the resin-plasticizer blend when melted and precipitating therefrom when cooled.

4. Laminated greaseproof paper having a laminating composition between the sheets made up of a resin-plasticizer composition carrying precipitated hydrogenated fatty oil and forming a soft, flexible bond between the sheets of paper at normal temperature, the hydrogenated oil amounting to around 30 to 33% of the composition and the composition when melted forming a thin, liquid, laminating layer effective in preventing separation of the sheets at elevated temperature while permitting sliding of the sheets relative to each other.

GEORGE C. BORDEN, Jr.
WALTER HERRICK.

REFERENCES CITED

The following references are of record in the file of this patent:

UNITED STATES PATENTS

| Number | Name | Date |
|---|---|---|
| 2,031,036 | Dreyman | Feb. 18, 1936 |
| 2,098,222 | Barnhart | Nov. 9, 1937 |
| 2,098,223 | Barnhart | Nov. 9, 1937 |
| 2,099,301 | Hamersley, et al. | Nov. 16, 1937 |
| 2,119,509 | Barnhart | June 7, 1938 |
| 2,102,207 | Hunt, et al. | Dec. 14, 1937 |
| 2,128,739 | Connor | Aug. 30, 1938 |
| 1,276,507 | Ellis | Aug. 20, 1918 |
| 2,027,390 | Lazier | Jan. 14, 1936 |